United States Patent [19]

Starks

[11] Patent Number: 4,788,906
[45] Date of Patent: Dec. 6, 1988

[54] GRILL

[76] Inventor: Jimmie Starks, 5510 N. 50th St., Omaha, Nebr. 68104

[21] Appl. No.: 105,863

[22] Filed: Oct. 8, 1987

[51] Int. Cl.$^4$ .............................................. A47J 37/00
[52] U.S. Cl. .................................... 99/450; 126/25 R
[58] Field of Search ......................... 99/450, 449, 447; 126/9 R, 9 B, 11, 26, 25 R, 25 A

[56] References Cited

U.S. PATENT DOCUMENTS

| | | | |
|---|---|---|---|
| 2,666,426 | 1/1954 | Pollard | 126/9 B |
| 4,170,173 | 10/1979 | Bradford | 99/446 |
| 4,392,419 | 7/1983 | Bonny | 99/339 |

Primary Examiner—Henry J. Recla
Assistant Examiner—Linda J. Sholl

[57] ABSTRACT

A grill of the type cut from a steel barrel the rough edges of which are faced with angle iron. Front and rear angle irons are supported by legs. The horizontal rear angle irons provide flat surfaces for wings of the lid hinges. Access to the top of the grate is through a grate door and a lower door with arcuate bottom allows raking out of ash with an arcuate lower edged removal tool stored on the grill. Wheels at one end provide ease of transport because a shelf at the other end serves also as a lifting handle. The draft regulation damper hinges to the top of a chimney. The angle iron facing members at the front and back of the lower barrel section support the legs and so serve as special frame members. These special frame members have projecting portions on the opposite end of the grill from the wheels. It is to these projecting portions which are strongly of one piece with the special frame members that a handle is attached for lifting one end of the grill during transport thereof across the ground.

5 Claims, 1 Drawing Sheet

U.S. Patent
Dec. 6, 1988
4,788,906
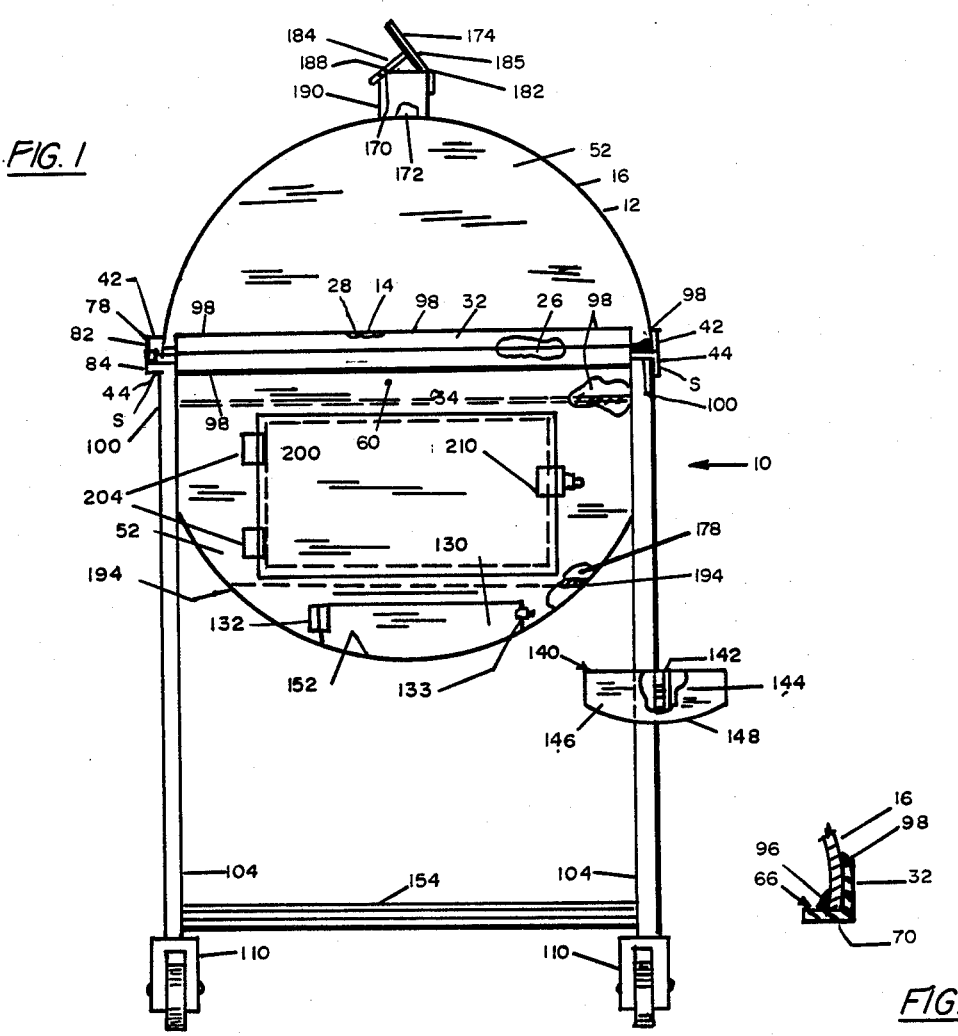
FIG. 1
FIG. 3
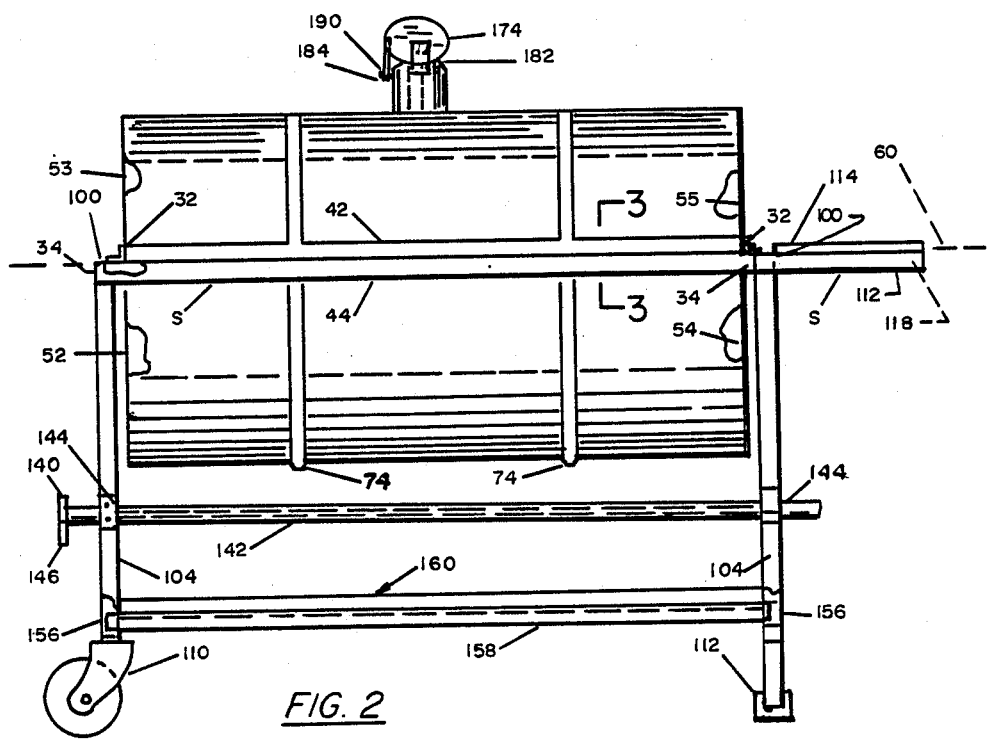
FIG. 2

GRILL

BACKGROUND

In the past barrel grills have been made for decades. Their advantage is that readily available oil barrels make good fire chamber housings but with disadvantages.

One of these disadvantages has been that in the process of cutting the barrel with either saw or torch to form top and bottom fire chamber housing sections, the cut edges so formed are jagged.

The sealing of gases inside the barrel is made difficult by the possibility of gas and air passage through the uneven jagged edges of the top and bottom housing sections where they engage each other.

Another disadvantage of the jagged edges, which have been common to all prior art, barrel grills to my knowledge, has been that many people have become injured on these jagged surfaces, cutting their hands open on the rusty steel.

An object of this invention is to provide a way to more effectively seal the opposed edges of top and bottom housing sections by covering these jagged edges with economically available extruded steel sections, such as by angle iron. When such angle irons are fixed to the housing sections then it is the straight horizontal surfaces of upper and lower angle irons that engage each other when the grill is closed. Although this does not completely prevent passage of air and gases between the upper and lower housing sections, yet it does reduce it greatly.

The same covering of the jagged edges has the extra purpose of providing smooth surfaces that will not cause injury to the hands or arms of persons operating the grill, or persons who might fall against the grill.

Another problem with barrel grills of past decades has been the mounting of hinges. Since hinges are flat at their wings, and since they must be attached to the curved surface of the housing sections, the hinge mountings have been relatively crude, of undesirable appearance, and in some homemade grills of a looseness.

However with the sealing coverings of this invention, flat surfaces are provided for attaching to the flat wings of the hinges whereby strong and attractive attachments are provided, much stronger than attaching the hinges to tiny sections of the sheet metal housings, the greater strength being because the coverings are themselves welded to the housing sections and many places along each of the sealing covering pieces.

Yet another problem has been the rebuilding of a fire in barrel grills. In the prior art it has been necessary to remove the meat holding grill surface from the grill in order to put more fuel on the fire therebeneath. This has been a special problem because it is easy to spill the meat off onto the ground during this removal, but more especially because the meat grid that supports the meat is very hot and cannot be handled with the hands.

This also necessitates the reaching with the hands up close to the hot fire itself in order to take the meat grid off of the grill. In addition this same supporting meat grid, with the meat thereon, must be placed back onto the grill as an additional step. Again this must be done with great care not only to prevent spillage of the meat therefrom, but also to avoid getting burned by the fire in the grill, which at that time is probably burning quite high.

Another problem with barrel grills has been control of the air supply for the fire chamber. In the past this has been done by such crude methods as poking a stick in between the lid and the bottom so as to hold the lid up a bit to let in air. Not only is this not the ideal place to let in air, but also quite a supply of sticks of various diameters are necessary in order to select one that best regulates the air flow.

A further disadvantage is that after a stick has been useful for a short time, then it must be removed or replaced with a stick of a different diameter. It is therefore an object of this invention to make it possible to control the ventilation in a more ideal way by means of a gate at the chimney and also at a lower opening at the bottom of the grill under a fire carrying grate, the lower opening having an ash door thereon which can be opened any selected amount to let in air. Since the damper on the chimney can also be opened varying amounts, there is a possibility of an infinite variation of air flow control with good passage through the fire.

While an ash door below a fire stoking door has been a well-known combination in cool furnaces, yet no one to my knowledge, has ever conceived of applying this to a barrel grill.

In the prior art the attachment of legs to the bottom housing of the fire chamber of such grills has not been as strong as desirable because of the necessity to connect the legs directly to the sheet metal housing itself. It is an objective hereof to use the strong jagged edge covering members as part of the connection of the legs to the fire chamber bottom section with the remainder of the connection being the welding of the jagged edge coverings and sealing members to the bottom housing section at many points.

Grills of the prior art have often been difficult to move even though they may have had wheels because of the lack of a convenient place to grip the grill when pushing. An objective hereof is to make possible effective moving of the grill from place to place, even while it is hot, and even though there is an economical use of only two wheels, by providing a handle on the opposite end of the grill from the wheels, the handle having a double purpose of also being a shelf support.

BRIEF DESCRIPTION OF THE DRAWINGS

FIG. 1 is a right end view of the grill of this invention shown with certain portions thereof removed for revealing other portions therebehind.

FIG. 2 is a frontal elevation of the grill of FIG. 1 with various parts broken away to show otherwise hidden parts of the grill.

FIG. 3 is a sectional view taken along the line 3—3 of FIG. 1 but showing only parts that are attached to the upper grill housing section.

DESCRIPTION OF THE PREFERRED EMBODIMENT

In FIG. 1 the grill of this invention is generally indicated at 10 and has a fire chamber housing generally indicated at 12 and having a bottom section 14 which is concave on its upper side and an upper section 16 which is concave on its lower side.

The housing sections 14 and 16 are, in total, cylindrical on their combined outer surfaces at time when the grill is closed so that they are formable substantially by taking a drum of a type having an outer surface which is generally cylindrical and cutting the drum along a horizontal plane parallel to an axis of the cylindrical outer surface of the drum.

Such cutting is preferably not at the center of axis of the drum as in FIG. 2 but above the center as seen in FIG. 1 so that the lid or upper housing section 16 is of lesser vertical dimension than the bottom section 14.

Such cutting, whether by torch or by saw, causes a jagged edge to be formed as seen at 26 where the cut is made on the upper section 16 and a similar jagged edge to be formed at 28 where the cut is made at the top of the lower section 14 of the housing 12.

It is the object of this invention to cover the jagged edges 26 and 28 with sealing members which are upper and lower end wall sealing members 32 and 34 and upper and lower side wall sealing members 42 and 44 of which latter there are a pair of adjacent and opposed members at the front of the grill, as seen in 42 and 44 which can be called a pair of forward sealing members formed by an upper sealing member 42 and a lower sealing member 44.

Each sealing member 32 forms a pair of sealing members when taken together with its adjacent sealing member 34.

Each sealing member of a pair engages the other sealing member of a pair at times when the grill is closed for preventing air from passing between the sealing members of that pair.

The upper housing section has end walls 52 and 54 which are each vertical and each at a right angle to the horizontal axis 60.

In FIG. 1 the jagged edges 26 and 28 are above the horizontal center axis 60 of the fire chamber housing 12 of the grill.

The sealing members 32, 34, 42, and 44 can be also called protective sealing members because they protect the hands and bodies of persons from becoming cut on the jagged edges respectively.

Each sealing member 32, 34, 42 and 44 has a covering surface 66, best seen in FIG. 3, and in engagement with a respective jagged edge.

Each sealing member also has a sealing surface 70 on the opposite side the respective sealing member from the respective covering surface. Each pair of the sealing members has its respective sealing surfaces 70 disposed in parallelism with and in engagement with each other, each being in a horizontal plane for good sealings. This is to restrain hot gases from escaping therebetween out of the fire chamber and for restaining air from entering into the fire chamber from the outside therebetween.

The oil drums, which the housings are made, are of steel and are cylindrical on their other sides, although they usually have outwardly protruding circular bands 74 therearound as seen in FIG. 2 only.

The rearward ones of the sealing members 42 and 44 can be seen in FIG. 1 to have a hinge 78 attached thereto, the hinge having an upper wing 82 and a lower wing 84. The wings 82 and 84 are flat on their forward side as is conventional with hinges and so they have their flat forward sides fixed against flat rearward sides of the respective sealing members 42 and 44 at the rear of the grill. This gives a strong, firm anchoring for the hinges, superior to anchoring them to the thin housing material.

The sealing members and the respective housing are attached in many places on each sealing member by welding such as welding seen at 96 in FIG. 3, although such welding could be on the outer side as shown at 98 in FIG. 3.

Since it is easier to see the weldings at 98 in the views hereof the weldings 98 are used to show attachments of the sealing members 32, 34, 42, and 44 to the respective bottom and top grill housing sections 14 and 16.

The hinge 78 can be one single long hinge, or multiple hinges as is cheaper. Two of the sealing members 44 are at the front and rear of the grill and seal at the front and rear jagged edges of the bottom housing section 14 and are herewith called supporting sealing members S. The supporting sealing members S have left and right ends providing four post-supportable points 100 on the supporting members S at which each one of four spaced posts, including two left posts 104 and two right posts 106, are welded. The posts 104 and 106 extend vertically downward from the respective points 100.

A pair of wheel assemblies 110 are attached to the lower ends of the left posts 104. The lower ends of the right posts 106 are provided with caps 112 for engaging the ground.

The supporting sealing members S extend to the right of the post 106 at substantial distance as seen at 112 for supporting a horizontal shelf 114 and the right end of the supporting members S at the portions 112 thereof are interconnected by a forwardly-to-rearwardly extending member 118 welded thereto which latter serves as a handle which can be gripped so as to raise the right end of the grill to wheel it across the ground on the wheel assembly 110.

In FIG. 1 a meat grid 120 extends across a top section of the bottom housing 14 and is mounted thereon in the usual manner.

A lower air opening 122 in the left end wall 52 of the bottom housing 14 is disposed below the grid 120 and can be used to admit air into the bottom housing. The lower air opening 122 is provided with an adjustable closing means or ash door 130 which is capable of closing the lower air opening 130 selective amounts. The ash door 130 is attached to the end wall 14 by a hinge 132 so that it can be opened selected amounts for admitting only desired amounts of air.

The opening 130 extends completely to the lower side of the lower housing portion 14 so that ash can be pulled across the inner side of the lower housing 14 and out through the opening 122 when the door 130 is opened. This is made further made easy by providing the ash hoe 140 seen in FIG. 1 having an elongated handle 142 standing from right to left in storage and received in brackets 144 attached to the forward sides of the respective forward posts 104 and 106 whereby the handle 142 is easily removed and the hoe kept in handy storage.

The hoe blade 146 is planar and at a right angle to the elongated handle 142 and the blade 146 has a lower edge 148 of the same curvature as the inner side of the bottom housing portion 14 as seen at 152 so as to do a good job of fitting complementarily thereto for the thorough removal of ash.

At the bottom of the grill, the lower ends of the posts 104 are connected by a cross frame member 154 at the right side of the grill and by another cross frame member 156 at the left side of the grill and by front and rear shelf-supporting frame members 158 where the members 156 and 158 connect at their ends to respective posts for providing a rectangular support for a shelf 160 which extends horizontally across the underside of the grill just above the wheels 110.

The grill also has a chimney 170 in the middle of the top of the upper housing section 16 and in communication with the latter through an opening 172. The chimney 170 and the opening 172 can be closed selective amounts, by a damper or outlet door 174, for regulating the outflow of gases from the fire chamber 178 through the opening 172. The door 174 is hinged at 182 to the chimney 170 and on one side thereof so that it can swing upwardly and be held in a variety of positions by an adjustable latch 184, pivoted to the door 174 at 186, and having notches 188 on its underside receiving a pin 190 attached to the chimney 170.

In FIG. 1 can be seen, at a level disposed above the ash door 130, a grate 194 extending horizontally across and supported on the bottom housing 14. The grate 194 supports fuel for a fire which can be inserted above the grate 194 through a fuel opening 200 in the left endwall 52 of the bottom housing section 14.

The fuel opening 200 is closeable by means of the fuel door 202 mounted on the bottom housing end wall 52 by hinges 204; and on the opposite side of the door 202 from the hinges 204 a suitable latch 210 is provided which can be unlatched for the opening of the fuel door 202.

The fuel door 202 makes possible the adding of the fuel to the fire while cooking without removing the meat or the meat supporting grid 120.

The top housing section has a handle 210' on the forward side thereof.

I claim:

1. A grill comprising a firechamber having a pair of firechamber sections comprising a bottom section and a top section, said firechamber sections each having sidewall and end wall portions, said bottom firechamber section being concave on its upper side, said top firechamber section being concave on its underside, said top firechamber section being raisable with respect to said bottom firechamber section, said firechamber sections each being of the shape of a portion of a cylinder so as to be formable from a metallic liquid-container drum of a type having a substantially cylindrical outer surface by cutting said drum into two parts along a plane parallel to the axis of such cylindrical outer surface, said firechamber sections each having a generally straight jagged edge, each jagged edge being opposite a jagged edge of the opposite firechamber section, opposed jagged edges comprising a pair of jagged edges, protective sealing members arranged in pairs, the sealing members of a pair being attached to the top and bottom firechamber sections respectively, each sealing member of a pair having a covering surface disposed adjacent a different one of said jagged edges and disposed extending horizontally, each sealing member also having a horizontal straight sealing surface disposed on the opposite side of the respective sealing member from the respective said covering surface, front ones of said sealing members being on said top and bottom sections respectively and having their sealing surfaces parallel to and substantially sealing against the sealing surface of an opposite sealing member to substantially restrain hot gases from escaping therebetween out of said firechamber, two of said sealing members being supporting sealing members disposed on said bottom section on opposite sides thereof, the ends of said two supporting sealing members providing four post-supportable points, said grill having four spaced posts, each of said posts having an upper end supporting and attached to one of said supporting sealing members at one of said post-supportable points, a pair of wheels supporting the lower ends of two respective ones of said posts at one side of said grill, said two supportive sealing members, having portions of one piece therewith and projecting to a certain side of said firechamber housing sections, a handle means useful for assisting a lifting of the respective end of said grill and for the pushing of said grill, said handle means being on the opposite side of said grill from said wheels, said projecting portions serving as parts of said handle means.

2. The grill of claim 1 having a meat grid for supporting meat mounted in said bottom housing section, a lower opening through said bottom housing below said grid through which air can pass into said housing, a lower adjustable closing means capable of closing said lower opening selective amounts and attached to said bottom housing.

3. The grill of claim 2 wherein an upper opening through said top housing section for escape of gasses, an upper adjustable means movably attached to said top housing section and capable of closing said second opening selected amounts.

4. The grill of claim 3 having a supporting grid for supporting meat mounted in said bottom housing section, a grate disposed beneath said meat grid, said grate being disposed above said lower opening, said lower housing having a fuel opening substantially disposed at a level above said grate for insertion of extra fuel without removal of said meat grid, openable means movable attached to said bottom housing section for closing said fuel opening.

5. The grill of claim 2 having a meat grid mounted in said bottom housing section, a grate disposed beneath said meat grid, said grate being disposed above said lower opening, said lower housing having a fuel opening substantially disposed at a level above said grate for insertion of extra fuel without removal of said meat grid, openable means movably attached to said bottom housing section for closing said fuel opening.

* * * * *